US006668481B2

United States Patent
Garcia

(10) Patent No.: US 6,668,481 B2
(45) Date of Patent: Dec. 30, 2003

(54) CASE FOR A FISHING ROD AND REEL

(76) Inventor: Anthony Garcia, 1412 Andrew Ave., Anderson, CA (US) 96007

( * ) Notice: Subject to any disclaimer, the term of this patent is extended or adjusted under 35 U.S.C. 154(b) by 0 days.

(21) Appl. No.: 10/108,371

(22) Filed: Mar. 29, 2002

(65) Prior Publication Data

US 2002/0178642 A1 Dec. 5, 2002

Related U.S. Application Data

(60) Provisional application No. 60/295,579, filed on Jun. 5, 2001.

(51) Int. Cl.[7] ............................................. A01K 97/08
(52) U.S. Cl. ........................................................ 43/26
(58) Field of Search .......................... 43/26; 206/315.11; 224/922

(56) References Cited

U.S. PATENT DOCUMENTS

| 2,149,087 | A | * | 2/1939 | Fisher ............................ 43/26 |
| 2,591,674 | A | * | 4/1952 | Chalker .................. 206/315.11 |
| 2,723,482 | A | | 11/1955 | Marten |
| 3,349,512 | A | * | 10/1967 | Walker ........................... 43/26 |
| 3,762,592 | A | * | 10/1973 | Mayes ......................... 220/4 B |
| 3,772,819 | A | * | 11/1973 | Ratzlaff ......................... 43/26 |
| 4,493,416 | A | * | 1/1985 | Steinman ............... 206/315.11 |
| 4,726,141 | A | | 2/1988 | McBride et al. |
| 4,967,504 | A | * | 11/1990 | Craft ............................. 43/26 |
| 5,005,743 | A | | 4/1991 | Ramsay |
| 5,046,279 | A | * | 9/1991 | Smith ............................ 43/26 |
| D321,281 | S | | 11/1991 | Cooper |
| 5,341,590 | A | | 8/1994 | Hepworth et al. |
| D355,071 | S | | 2/1995 | Stull |
| 5,425,194 | A | * | 6/1995 | Miller ............................ 43/26 |
| 5,515,641 | A | | 5/1996 | D'Alessandro |
| D395,360 | S | | 6/1998 | Schrader, Jr. |
| D402,807 | S | | 12/1998 | Brown |
| 5,956,885 | A | | 9/1999 | Zirbes |
| 5,957,284 | A | | 9/1999 | Caddell et al. |
| 5,960,950 | A | | 10/1999 | Meeker et al. |

* cited by examiner

Primary Examiner—Kurt Rowan
(74) Attorney, Agent, or Firm—Richard C. Litman

(57) ABSTRACT

A hard shell case for an assembled fishing rod and reel includes forward and rearward rod cover tubes and a laterally hinged reel case. the forward rod cover extends rearwardly beyond the attached reel of the assembly, with a portion of the forward cover cut away for reel clearance as the cover is installed on the rod. The rearward rod cover slides over the rearward end of the forward rod cover, leaving an exposed area around the reel attachment when the two rod cover portions are installed on the rod. A laterally hinged reel cover is then placed over the rod cover assembly opposite the reel and closed over the reel to complete the installation. The forward rod cover may alternatively be constructed in two telescoping portions to adjust for different rod lengths or disassembled rods, and a pliable reel cover may also be provided.

12 Claims, 4 Drawing Sheets

CASE FOR A FISHING ROD AND REEL

CROSS-REFERENCE TO RELATED APPLICATION

This application claims the benefit of U.S. Provisional Patent Application Ser. No. 60/295,579, filed Jun. 5, 2001.

BACKGROUND OF THE INVENTION

1. Field of the Invention

The present invention relates generally to protective cases and covers for various articles and equipment, and more specifically to a rigid, hard shell case for protecting a fishing rod and reel in its assembled state. The present rod and reel case encloses both the rod and reel with the reel installed upon the rod, thereby precluding any requirement for disassembly of the rod and reel assembly before storage in the case. A shorter second embodiment provides for storage of a disassembled rod, but with the reel still remaining installed upon the rod.

2. Description of Related Art

The sport of fishing has enjoyed increasing popularity with increasing leisure time available to many. While many persons fish for food, others enjoy the sport and challenge, returning their catches to the water after the catch. While the ultimate purpose of the hobby may vary among different anglers, it is universally true that well cared for tackle is critical for best performance.

However, the environment in which fishing tackle is used, is generally hard on equipment. Obviously, fishing equipment is subject to water and moisture, but there are other factors which affect the equipment as well. Fishing equipment is generally placed or stored in the bottom of a boat, pickup truck bed, or other low point in a vehicle, where dirt, dust, and other contaminants generally reside. Yet, many fishing tackle components are relatively delicate, or at least have certain delicate components, which require at least a certain amount of care and attention. Fishing reels are an obvious example of such delicate equipment, but even certain fishing rods, with their closely mating threaded assemblies and reel attachments, are subject to damage by dirt and moisture contamination.

While most fishing rod and reel assemblies are constructed to permit disassembly, this disassembly is often tedious and time consuming. For the angler who fishes frequently, such assembly and disassembly of his or her equipment eats up valuable time which could otherwise be spent directly on fishing. The frequent assembly and disassembly of the various components of the fishing tackle, also increases wear and tear on the tackle, leading to further problems and need for repair. Accordingly, many anglers find it desirable to keep their fishing equipment in an assembled state, but an assembled rod and reel present a relatively fragile assembly, which is prone to damage if left exposed in the bottom of a boat, pickup truck, or similar relatively harsh environment.

Accordingly, a need will be seen for a rigid, hard protective case for the storage and protection of an assembled fishing rod and reel. The present protective case may be configured to hold an assembled rod therein, with its reel remaining attached to the rod, or may be provided in a shorter length for the storage of a "broken down" rod, in which the rod has been disassembled into two or more shorter lengths. In either embodiment, the reel remains attached to the rod, thereby greatly reducing the time otherwise required for rethreading the fishing line through the rod ferrules and other tedious tasks normally required when a fishing reel is separated from its rod.

A discussion of the related art of which the present inventor is aware, and its differences and distinctions from the present invention, is provided below.

U.S. Pat. No. 2,723,482 issued on Nov. 15, 1955 to Ben G. Martin, titled "Rod And Reel Protector," describes a cover for a fishing rod and reel assembly. The Martin protector is not a rigid case, but is merely a flexible cover formed of a pliable, flexible material such as fabric, leather, or a flexible plastic sheet material of some sort. As such, the Martin protector cannot provide protection to the equipment from impact and/or other physical damage, as can the present rigid, hard shell rod and reel case. As the Martin cover is not formed of rigid materials, it does not include many of the features of the present rigid case, such as telescoping components, a hinged reel cover, etc.

U.S. Pat. No. 4,726,141 issued on Feb. 23, 1988 to Charlie J. McBride et al., titled "Fishing Rod And Reel Carrying Case," describes a reel cover formed of a pliable, flexible material (fabric, plastic, leather, etc.). As such, the device does not actually comprise a case, as it does not provide any rigid protective shell for the equipment stored therein. Moreover, the McBride et al. cover does not cover any significant portion of the fishing rod, but is relatively short and covers only the butt or handle portion of the rod and its attached reel. The remainder of the rod extends outwardly beyond the opening in the pouch or cover. In contrast, the present fishing rod and reel case provides rigid protection for the entire assembled rod and reel contained therein.

U.S. Pat. No. 5,005,743 issued on Apr. 9, 1991 to Richard P. Ramsay, titled "Telescopic Carrying Case," describes a rigid, elongate case for the carriage of relatively thin, elongate articles such as skis, ski poles and fishing rods. It would appear that if the Ramsay case is sufficiently long for the carriage of skis therein, that it would also suffice for the carriage of assembled fishing rods therein as well. However, Ramsay does not provide any wider area in his case, for the enclosure of a fishing reel therein for the reel to remain attached to the rod. Rather, the reel would have to be removed from the rod in order to place the rod into the Ramsay case, which still leaves the problem of storage for the reel after time has been taken to remove the fishing line from the rod. The present invention obviates these problems, by providing room for the rod and its attached reel.

U.S. Pat. No. 5,341,590 issued on Aug. 30, 1994 to Allen Hepworth et al., titled "Carrying Case For Fly Fishing Rod And Reel," describes a case formed of a rigid plastic shell with an end opening. None of the components telescope or slide longitudinally relative to one another, as in the assembly of the rod carrying portion of the present rod and reel case. The present case may be adapted for the carriage of a fly fishing rod and reel assembly, or other assembly where the reel is located relatively close to the butt end of the rod. However, the present case is more particularly adapted for the carriage of other types of rod and reel assemblies, where the reel is most often secured to the rod at some distance from the butt toward the tip of the rod. The present rod and reel case provides for this by means of its various telescoping and sliding components, and the "clamshell" arrangement of its reel closure around the rod portion of the case, with the rod portion of the case extending in each direction therebeyond.

U.S. Pat. No. 5,515,641 issued on May 14, 1996 to David A. D'Alessandro, titled "Tangle-Avoiding, Quick-Use, Fishing Pole Sheath," describes a pole cover that extends only from the tip of the pole to the forward end of the reel, where it secures to the reel by means of an elastic strap. The D'Alessandro cover is formed of a pliable, flexible material (fabric, vinyl plastic, etc.), rather than being formed of a rigid material, as in the case of the present rod and reel cover. The D'Alessandro cover is more closely related to the cover of the Marten '482 U.S. patent, discussed further above, than to the present rod and reel case.

U.S. Pat. No. 5,956,885 issued on Sep. 28, 1999 to Michael L. Zirbes, titled "Fishing Reel Cover," describes a cover formed of a flexible, pliable material (fabric, vinyl, leather, etc.) for covering only the reel installed on a fishing rod. While Zirbes describes his reel cover as being of "clamshell" configuration, the relatively soft and pliable nature of the materials used cannot provide the rigid closure conventionally considered to be a part of a "clamshell" structure, as provided by the present invention with its laterally opening clamshell reel cover. Moreover, Zirbes does not disclose any form of cover for the rest of the fishing rod assembly, whereas the present case encloses the complete assembled fishing rod and reel.

U.S. Pat. No. 5,957,284 issued on Sep. 28, 1999 to Douglass E. Caddell et al., titled "Floating, Transparent Protective Covering For A Fishing Rod," describes a rigid cover having a length only sufficient to cover the rod tip. The Caddell et al. cover does not extend to cover even the majority of the rod length, and stops far short of the reel. The only closure provided is a longitudinally split plug, which fits around the rod and inserts into the otherwise open end of the cover. No clamshell or other covering for the reel or telescoping or sliding rod case is disclosed by Caddell et al. in the '284 U.S. patent. Other than the difference between the rigid and flexible materials used, the Caddell et al. cover more closely resembles the cover of the '641 U.S. patent to D'Alessandro, than it does the present rod and reel cover invention.

U.S. Pat. No. 5,960,950 issued on Oct. 5, 1999 to Paul K. Meeker, titled "Fishing Rod And Reel Assembly Carrying Case," describes a case formed to have a rigid plastic shell, for enclosing an assembled rod and reel. The Meeker case opens in a different manner than that of the present protective case, however, with the Meeker case being hinged along one side or edge thereof to open and close as two lateral halves. Moreover, the Meeker case is relatively bulky, and includes a pair of tackle boxes therein. In contrast, the present rod and reel case is considerably thinner, providing sufficient interior volume only for the rod and its attached reel. The opening of the present case is considerably different than the Meeker case, with the present case including at least one sliding or telescoping portion over the butt of the reel, with a separate laterally opening clamshell cover for the reel. Moreover, Meeker does not disclose any form of shoulder carrying strap, as provided in the present fishing rod and reel case invention.

U.S. Pat. No. D-321,281 issued on Nov. 5, 1991 to Dennis Cooper, titled "Fly Rod Case," illustrates a design having a generally cylindrical reel enclosure at its butt end, with the reel enclosure being split into two semicylindrical halves and hinged together for closure over the reel. The Cooper case thus more closely resembles the fly rod case of the Hepworth et al. '590 U.S. patent, than it does the present fishing rod and reel case invention.

U.S. Pat. No. D-355,071 issued on Feb. 7, 1995 to Ronald B. Stull, titled "Compartmentalized Fishing Pole And Accessory Carrier," illustrates a design comprising a box-like structure having two halves, hinged together along one edge. Each half has a pair of complementary longitudinal channels therein, which form passages for securing about the disassembled components of a fishing rod when closed therearound. The Stull design appears to be suited only for holding the disassembled components together, and does nothing to protect the components from damage or contamination, as does the present rod and reel case invention.

U.S. Pat. No. D-395,360 issued on Jun. 13, 1998 to William L. Schrader, Jr., titled "Fishing Rod Case," illustrates a design obviously formed of a flexible material and having a zipper closure. The Schrader, Jr. cover is relatively thin, and cannot provide room for a fishing reel therein. The Schrader, Jr. cover more closely resembles the cover of the Marten '482 U.S. patent, than it does the present rod and reel case invention.

Finally, U.S. Pat. No. D-402,807 issued on Dec. 22, 1998 to Thomas E. Brown, titled "Protective Cover For Fishing Rod Tip," illustrates a design resembling a shortened, tip portion of the fishing rod covers of the D'Alessandro '641 Utility patent or the Schrader, Jr. '360 Design patent, both discussed above. No rigid enclosure for the entire rod and reel assembly is apparent in the Brown '807 Design patent.

None of the above inventions and patents, either singly or in combination, is seen to describe the instant invention as claimed.

SUMMARY OF THE INVENTION

A hard protective case or shell provides protection for an assembled, or semi-assembled, fishing rod and reel. The present case is preferably formed of a hard plastic material, and comprises several sections which fit around various portions of the rod and reel assembly. The rod forward end enclosure is formed as a unitary component having a generally triangular cross section in order to fit about the rod and its fishing line guides extending therefrom. The tip of the rod end enclosure is closed. This component may alternatively be formed in two telescoping portions, to adjust for the rod length or to enclose a disassembled rod.

The central area of the cover is cut away to provide clearance for the attached reel on the rod. A separate, laterally hinged reel cover is provided, which closes laterally about the reel and the central portion of the rod case. Alternatively, or in addition to the hard reel case, a flexible reel cover having an elastic closure may be provided to secure about the reel. The flexible reel cover provides excellent temporary protection for the reel, when it is not desired to assemble the rod cover about the rod in order to provide anchorage for the rigid reel cover.

The butt end of the rod is protected by a sliding or telescoping case portion having a similar cross section to the forward rod end case. The rod is inserted in the front end case, the butt end cover is slid over the open medial area of the front case, and the reel case is hinged closed over the central portion of the rod cover and the reel assembled to the rod.

Accordingly, it is a principal object of the invention to provide a hard protective case for an assembled fishing rod and reel, protecting the rod and reel assembly from moisture, dirt, and/or other contaminants.

It is another object of the invention to provide a case for a fishing rod and reel, comprising at least a forward tubular rod cover portion having clearance for a fishing reel attached to the rod, a rearward tubular rod cover portion, and a laterally hinged reel cover fitting removably over the reel clearance portion of the forward rod cover and over the reel.

It is a further object of the invention to provide an alternative embodiment rod and reel case, having a telescoping forward rod end cover for accommodating fishing rods having different lengths and/or rods which have been at least partially disassembled.

Still another object of the invention is to provide means for holding and/or carrying the rod and reel case, comprising a hand carriage strap, a shoulder carriage strap, and/or clip attachments for securing to another structure.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a multi-part case for protecting an assembled fishing rod and reel therein, with the components of the case being formed of a hard, rigid material (e.g., plastic, etc.) to provide optimum protection for the fishing tackle. The present case permits the reel to remain attached to the rod, thereby saving the angler a considerable amount of time, as it is not necessary to remove the reel from the rod for storage.

Figure 1:
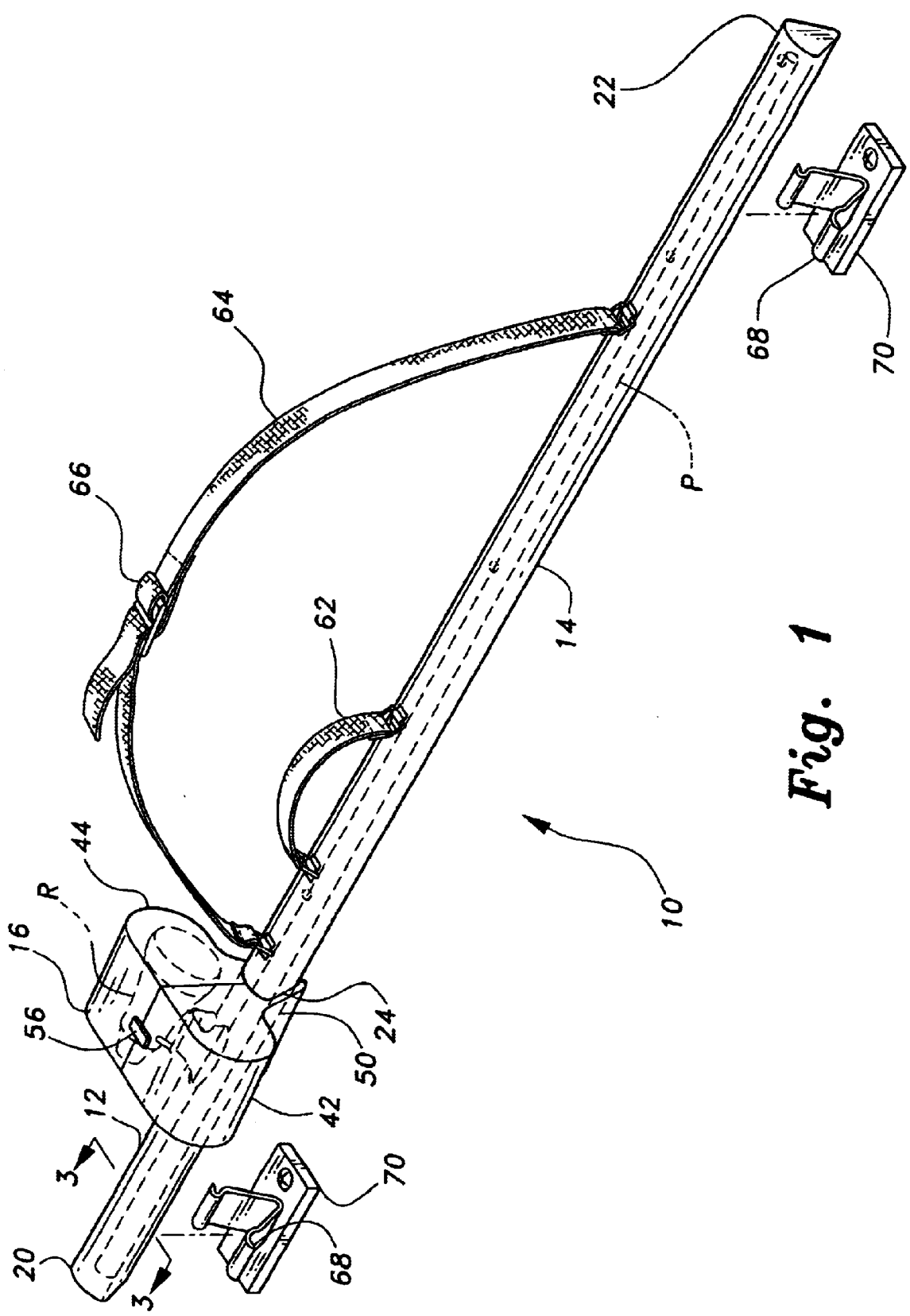
FIG. 1 is a perspective view of a case for a fishing rod and reel according to the present invention, also illustrating the clip means for temporarily securing the case to another structure.
Figure 2:
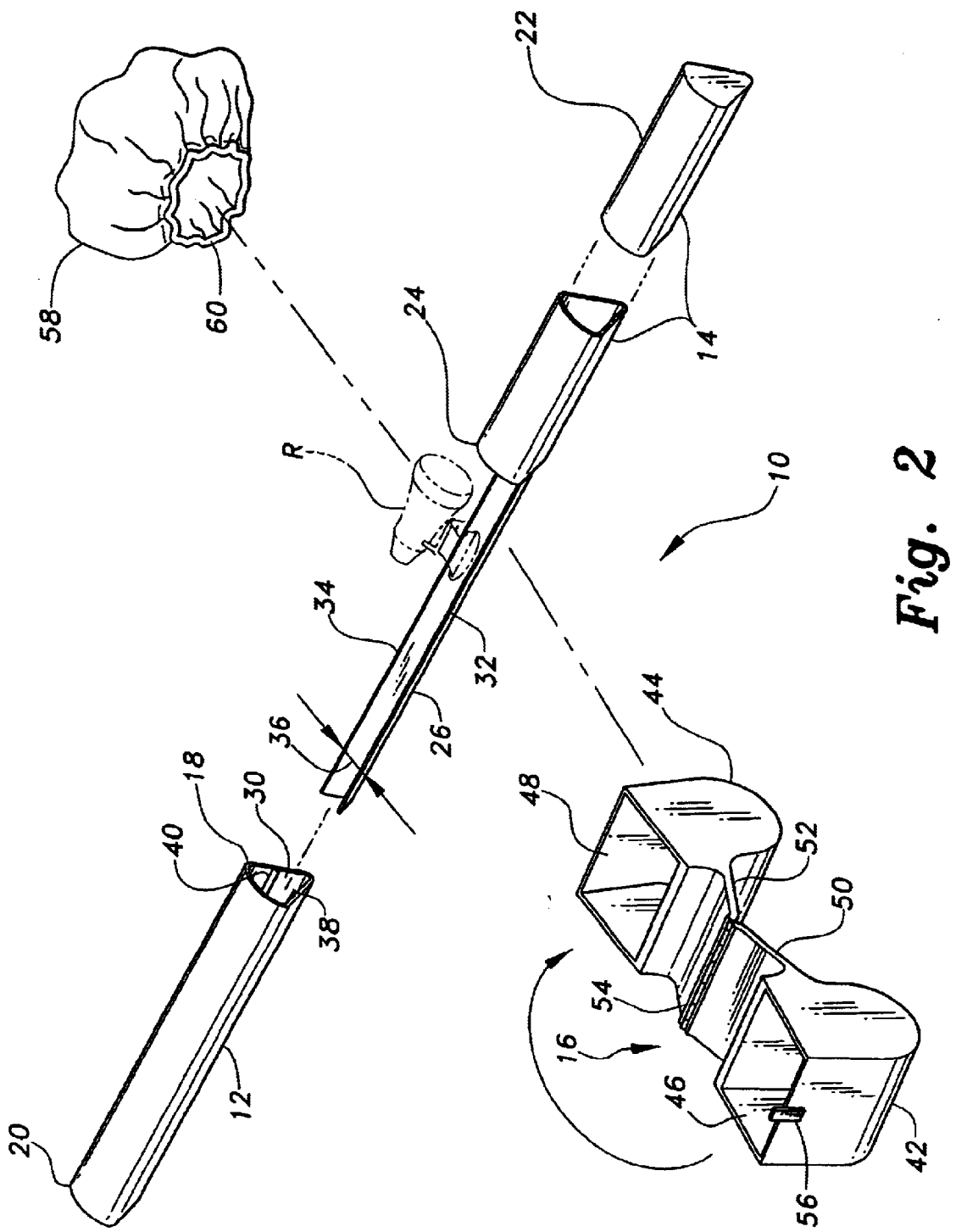
FIG. 2 is an exploded perspective view of the rod and reel case of FIG. 1, showing the assembly of the various components and an auxiliary reel cover of pliable material.

FIG. 1 of the drawings provides a perspective view of the present fishing rod and reel case, with FIG. 2 providing an exploded perspective view in order to show the various components comprising the present case. The present fishing rod and reel case 10 essentially comprises a rearward rod handle or butt cover 12, a forward rod shaft cover 14, and a separable reel cover 16. The forward and rearward rod covers 12 and 14 are installed over the fishing rod or pole P with the reel cover 16 installed over the reel R to completely enclose the fishing rod or pole P and reel R assembly therein, with the rod P and reel R being shown in broken lines within the assembled case 10 in FIG. 1 of the drawings.

The rearward rod handle cover 12 has a generally tubular configuration, as shown in FIG. 2 of the drawings. The rod handle cover 12 has an open rod handle insertion end 18, as shown in FIG. 2, with the opposite rod butt end 20 being closed. This rearward rod handle cover 12 secures over a portion of the forward rod shaft cover 14, as described further below.

The forward rod shaft cover 14 also has a generally tubular forward portion with a closed rod tip end 22 and an opposite open rod shaft insertion end 24. The cross sectional shapes and diameters of the forward cover 14 and rearward cover 12 are essentially identical, and preferably have a somewhat rounded triangular cross section, as shown in the cross sectional view of FIG. 3. This provides clearance for the relatively large diameter rod handle or butt and any relatively large diameter line guides extending from the relatively small diameter rod shaft.

The forward rod shaft cover 14 includes an elongate, rearwardly extending, open rod cover insertion channel 26 extending from the open rod shaft insertion end 24 thereof, shown clearly in FIG. 2 of the drawings. This channel 26 inserts at least partially into the open rod handle insertion end 18 of the rod handle cover 12, and has an outer dimension and configuration 28 which closely fits within the hollow interior walls 30 of the rod handle cover 12, as shown in the cross sectional view of FIG. 3. The rod cover insertion channel 26 has opposed first and second channel edges, respectively 32 and 34, which define an open reel clearance relief area 36 thereacross. This area 36 remains open when the rod cover insertion channel 26 is installed within the rearward rod handle cover 14, in order to provide clearance for the reel R attached to the fishing rod or pole P, as shown in FIGS. 1 and 2 of the drawings.

As the insertion channel 26 does not have an upper portion to bear against the upper interior of the rearward rod handle cover 12, some means must be provided to maintain the alignment and fit of the channel 26 within the rod handle cover 12. Accordingly, the interior of the rearward rod handle cover 12 includes opposed first and second insertion channel retaining tracks, respectively 38 and 40, formed therein. These two tracks 38 and 40 capture the respective edges 32 and 34 of the insertion channel 26 therein, and prevent the channel 26 from moving upwardly from the lower or bottom area of the rearward rod handle cover 12 to provide a close sliding fit of the channel 26 within the rod handle cover 12.

The above described structure suffices to hold and protect a fishing rod or pole P therein, with the open reel clearance area 36 of the insertion channel 26 providing clearance for a fishing reel R which remains attached or assembled to the rod or pole P. However, the reel R, which is the most delicate and critical component of the tackle assembly, would remain exposed without some additional protection. Accordingly, the present fishing rod and reel case includes a hard reel cover shell 16, which secures about the reel R which extends from the clearance area 36 of the insertion channel 26.

The reel cover 16 has opposed, mirror image first and second sides or halves, respectively 42 and 44, comprising first and second reel containment pockets 46 and 48. Each reel pocket 46 and 48 includes a channel capture flange, respectively 50 and 52, extending therefrom, with the channel capture flanges 50 and 52 configured to wrap around and fit closely to the exterior of the insertion channel 26 of the forward rod shaft cover 14. A lateral hinge 54 secures the two reel cover halves 42 and 44 together along the edges of the two channel capture flanges 50 and 52 opposite their respective reel pockets 46 and 48, with a conventional latch mechanism 56 provided at the facing edge of each of the reel pockets 46 and 48. The reel cover 16 secures about the insertion channel 26 with the hinge 54 placed opposite the clearance relief area 36 of the insertion channel 26 to secure the reel cover assembly 16 laterally around the insertion channel 26 and the fishing reel R extending therefrom, as shown in FIGS. 1 and 2.

FIG. 2 of the drawings also illustrates an alternative reel cover 58, comprising a pliable and flexible bag-like pocket having a gathered elastomer edge opening 60. This configuration is somewhat like a conventional "shower cap," but is somewhat smaller and with a somewhat smaller opening therein, in order to fit reasonably closely about the fishing reel R installed on the rod or pole P. This pliable reel cover 58 is suitable for temporary placement over the reel R where the fishing tackle is likely to be used in the very near future, to protect the reel R from contaminants such as salt spray, wind blown dust, etc., without providing the impact protection of the reel cover 16.

Returning to FIG. 1 of the drawings, it will be noted that various additional features may be provided with the present fishing rod and reel case 10, as desired. These features are not included in the other drawing Figs., for clarity in those drawing Figs. FIG. 1 illustrates various means which may be provided for carrying or securing the present case 10, with a hand carriage strap 62 and a shoulder carriage strap 64 being provided on the forward rod shaft cover 14. Either the hand strap 62 or the shoulder strap 64, or both, may be provided with the present fishing rod and reel case 10, as desired. The hand strap 62 may be formed of a flexible length of material, or may alternatively be formed as a rigid component added to or integrally formed with the forward rod shaft cover 14. The shoulder strap 64 may include conventional adjustment means (friction adjustment buckle or clip 66, etc.), as desired.

The present rod and reel case 10 may also include means for removably attaching the case 10 to a support structure (e.g., pickup bed sidewall, boat gunwale, etc.), if so desired. FIG. 1 illustrates a pair of structural attachment or support clips or clamps 68, which may be permanently secured to a suitable support structure by means of their bases 70. The clamps or clips are preferably formed of resilient metal sheets shaped to conform to the outer contours of the case 10 components, and may be coated with a plastic or elastomer material to reduce scratching and abrasion of the finish of the case 10 components secured therein, i.e., the rearward rod handle cover 12 and the forward rod shaft cover 14.

Figure 3:
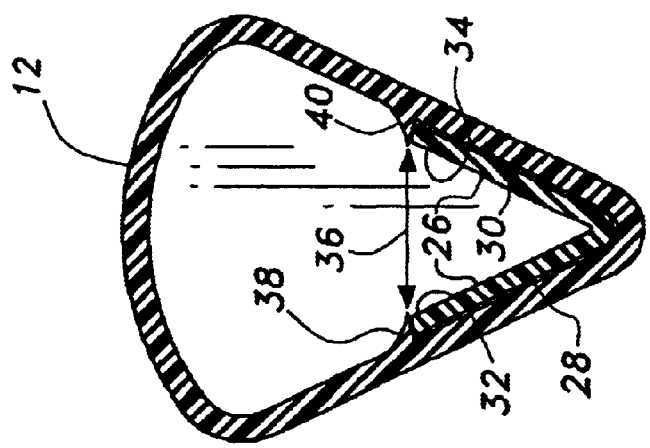
FIG. 3 is a detailed cross section elevation view through line 3—3 of FIG. 1, showing the detail of the fit of the butt cover portion of the case onto the forward cover portion of the case.

The above described fishing rod and reel case 10 illustrated in FIGS. 1 through 3 of the drawings, can accommodate a reasonably wide range of sizes and lengths of fishing rod and reel assemblies. However, it may be desirable to provide some adjustment for the length of the present rod and reel case, to allow a single case to be used with different lengths of fishing rods. Some means of adjusting the length would also permit the present case to be shortened for use with disassembled or "broken down" fishing rods, where the rod shaft has been at least partially disassembled. Such rod disassembly, along with a shortened or partially collapsed or retracted rod and reel case, can provide considerably more compact and convenient storage for the present rod and reel case, as well as the fishing rod and reel stored therein, without requiring removal of the reel from the rod.

Figure 5:
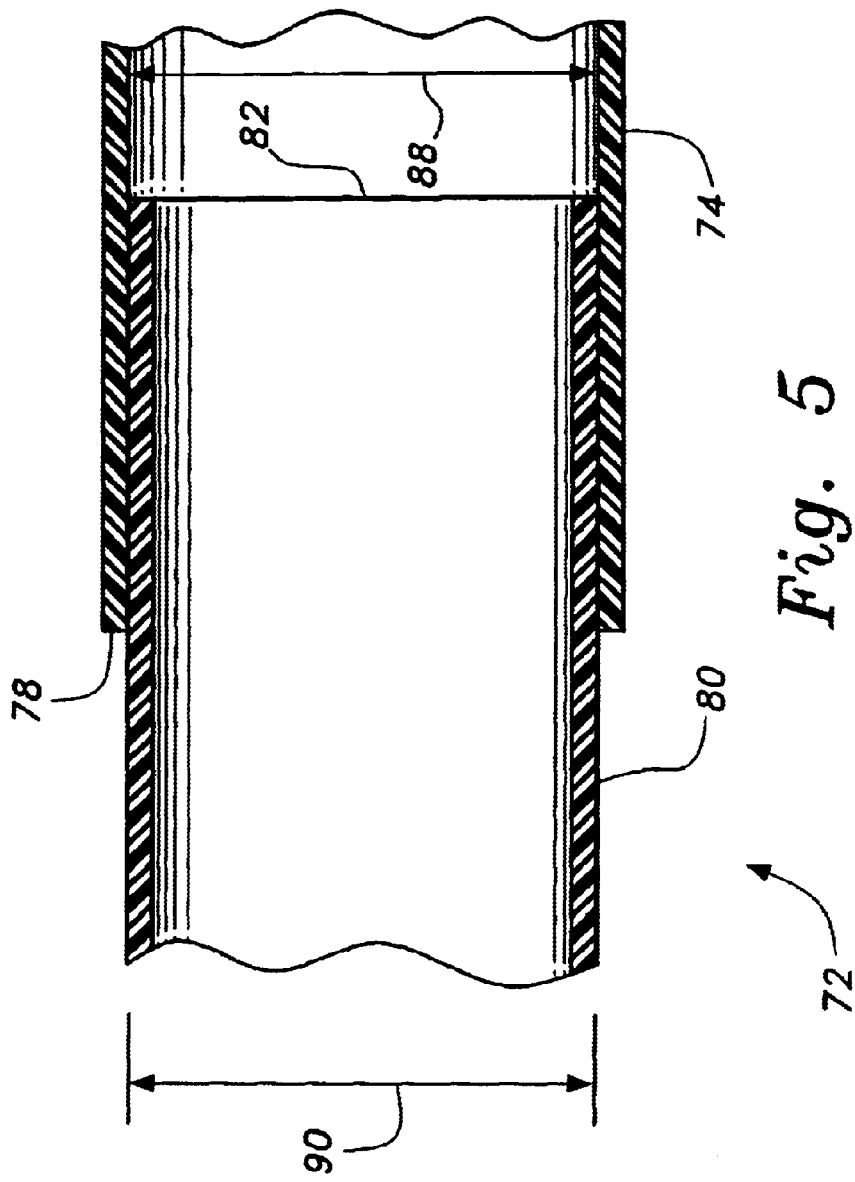
FIG. 5 is a side elevation view in section of the assembled telescoping components of FIG. 4, showing their fit together.
Figure 4:
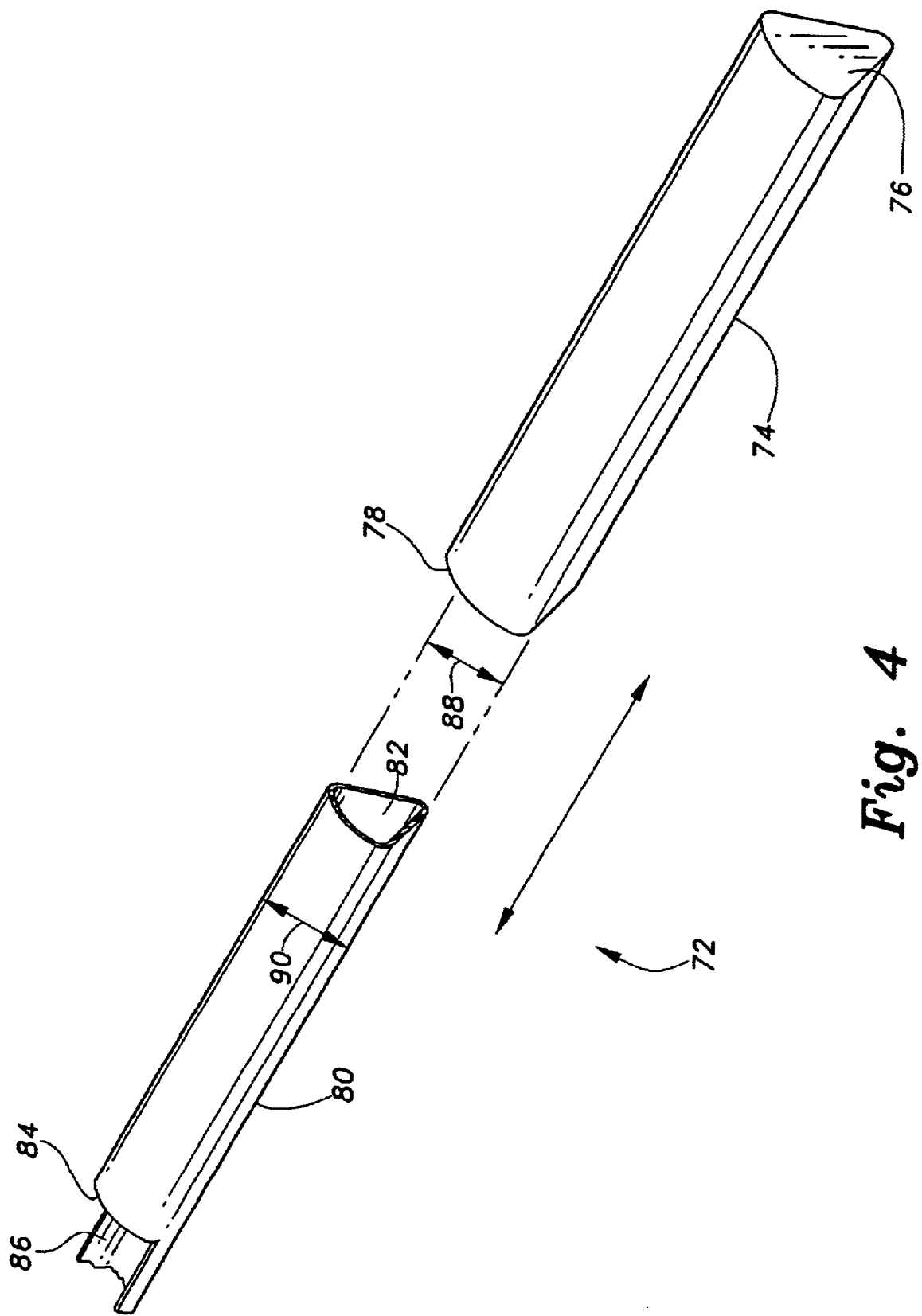
FIG. 4 is an exploded perspective view of an alternative embodiment of the forward portion of the present case, showing a telescoping structure for adapting to different rod lengths.

FIGS. 4 and 5 respectively provide an exploded perspective view and a detailed side elevation view in section of an alternative embodiment, wherein the alternative forward rod shaft cover 72 comprises two mutually telescoping sections. The first or forwardmost section 74 is analogous to the forward portion of the forward rod shaft cover 14 of FIGS. 1 and 2, and has a closed forwardmost or rod tip end 76 and an open end 78 opposite the rod tip end 76. However, this section 74 does not include a rearward insertion channel extension, as does the forward rod shaft cover 14 of the embodiment of FIGS. 1 and 2.

A generally intermediate tubular second section 80 is provided with an open forward end 82 and an opposite open rearward end 84, with an open rod cover insertion channel 86 extending rearwardly therefrom. The rod cover insertion channel 86 is shown only partially in FIG. 4, but it will be understood that it is essentially identical to the insertion channel 26 illustrated in FIGS. 2 and 3 of the drawings.

It will be seen particularly in FIG. 5, that the inner diameter 88 of the first or forwardmost section 74 is at least equal to, or perhaps very slightly larger, than the outer diameter 90 of the second or intermediate section 80. This permits the forwardmost section 74 to telescope over the intermediate section 80, thus permitting the length of the forward rod shaft cover 72 to be adjusted to adjust for the length of different assembled or disassembled fishing rods to be stored therein.

In conclusion, the present fishing rod and reel case provides much needed protection for costly fishing tackle, and provides an additional benefit in that the reel need not be removed from the rod for storage in the present case. This advantage of being able to store the entire assembled rod and reel within the present case, saves considerable teardown time which would otherwise be required to remove the reel from the rod and unthread the fishing line through the line guides of the rod. Then, when it is desired to use the rod and reel again, the above disassembly steps must be reversed to string the line back through the rod line guides and install the reel on the rod.

The present case provides further versatility by means of its telescoping forward end embodiment, which allows a rod to be disassembled and placed in the relatively short forward end portion of the case. The telescoping forward end also provides adjustment for different rod lengths, thus not requiring a relatively long forward end for the case when a relatively short fishing rod is to be stored therein. Other provisions of the present fishing rod case provide further benefits, i.e., the hand and shoulder straps and the clips providing attachment to a support structure (pickup sidewall, boat structure, etc.). The present fishing rod and reel case will thus prove to be a most valuable accessory for the angler who desires to provide optimum protection for his or her equipment.

It is to be understood that the present invention is not limited to the embodiments described above, but encompasses any and all embodiments within the scope of the following claims.

I claim:

1. A case for a fishing rod and reel assembly, comprising:
   a generally tubular rearward rod handle cover having an open rod handle insertion end and a closed rod butt end opposite said rod handle insertion end;
   a generally tubular forward rod shaft cover having an open rod insertion end and a closed rod tip end opposite said rod insertion end;
   said forward rod shaft cover including a rearward rod cover insertion channel extending from said rod insertion end thereof;
   said rod cover insertion channel of said forward rod shaft cover having an outer dimension closely fitting within said open rod handle insertion end of said rearward rod handle cover;
   said rod cover insertion channel having opposed first and second channel edges defining an open reel clearance relief area, for clearing the reel of the fishing rod;

first and second retaining tracks disposed within said rearward rod handle cover, for capturing said first and second channel edges of said rod cover insertion channel therein, for providing a close sliding fit between said rod cover insertion channel and said rearward rod handle cover; and a separate reel cover having a first side and a second side secured together by a laterally disposed hinge, for removably securing laterally about said rod cover insertion channel and the reel of the fishing rod.

2. The fishing rod and reel case according to claim 1, wherein said forward rod shaft cover comprises:

a forwardmost first section having a closed rod tip end and an open end opposite said rod tip end; an intermediately disposed second section having an open forward end and an open rod cover insertion channel opposite said open forward end; and said forward end of said second section telescopingly installing within said open end of said first section, for adjusting said forward rod shaft cover for different fishing rod configurations.

3. The fishing rod and reel case according to claim 1, further including:

a flexible, pliable reel dust cover having an opening with an elastic closure disposed therearound, for removably placing over the reel of the fishing rod for protecting the reel from contaminants and foreign matter.

4. The fishing rod and reel case according to claim 1, further including:

first and second structural attachment clips for permanently installing to a support structure, for removably securing said rearward rod handle cover and said forward rod shaft cover to the support structure as desired.

5. The fishing rod and reel case according to claim 1, further including:

a hand carriage strap and a shoulder carriage strap extending from said forward rod shaft cover.

6. The fishing rod and reel case according to claim 1, wherein said forward rod shaft cover, said rearward rod cover, and said reel cover are each formed of rigid plastic material.

7. A case for a fishing rod and reel assembly, comprising:

a generally tubular rearward rod handle cover having an open rod handle insertion end and a closed rod butt end opposite said rod handle insertion end;

a generally tubular forward rod shaft cover having an open rod insertion end and a closed rod tip end opposite said rod insertion end;

said forward rod shaft cover further including a rearward rod cover insertion channel extending from said rod insertion end thereof;

said rod cover insertion channel of said forward rod shaft cover having an outer dimension closely fitting within said open rod handle insertion end of said rearward rod handle cover;

said rod cover insertion channel having opposed first and second channel edges defining an open reel clearance relief area, for clearing the reel of the fishing rod;

a separate reel cover having a first side and a second side secured together by a laterally disposed hinge, for removably securing laterally about said rod cover insertion channel and the reel of the fishing rod; and first and second structural attachment clips for permanently installing to a support structure, for removably securing said rearward rod handle cover and said forward rod shaft cover to the support structure as desired.

8. The fishing rod and reel case according to claim 7, wherein said forward rod shaft cover comprises:

a forwardmost first section having a closed rod tip end and an open end opposite said rod tip end;

an intermediately disposed second section having an open forward end and an open rod cover insertion channel opposite said open forward end; and said forward end of said second section telescopingly installing within said open end of said first section, for adjusting said forward rod shaft cover for different fishing rod configurations.

9. The fishing rod and reel case according to claim 7, further including:

first and second retaining tracks disposed within said rearward rod handle cover, for capturing said first and second channel edges of said rod cover insertion channel therein, for providing a close sliding fit between said rod cover insertion channel and said rearward rod handle cover.

10. The fishing rod and reel case according to claim 7, further including:

a flexible, pliable reel dust cover having an opening with an elastic closure disposed therearound, for removably placing over the reel of the fishing rod for protecting the reel from contaminants and foreign matter.

11. The fishing rod and reel case according to claim 7, further including:

a hand carriage strap and a shoulder carriage strap extending from said forward rod shaft cover.

12. The fishing rod and reel case according to claim 7,wherein said forward rod shaft cover, said rearward rod cover, and said reel cover are each formed of rigid plastic material.

* * * * *